UNITED STATES PATENT OFFICE.

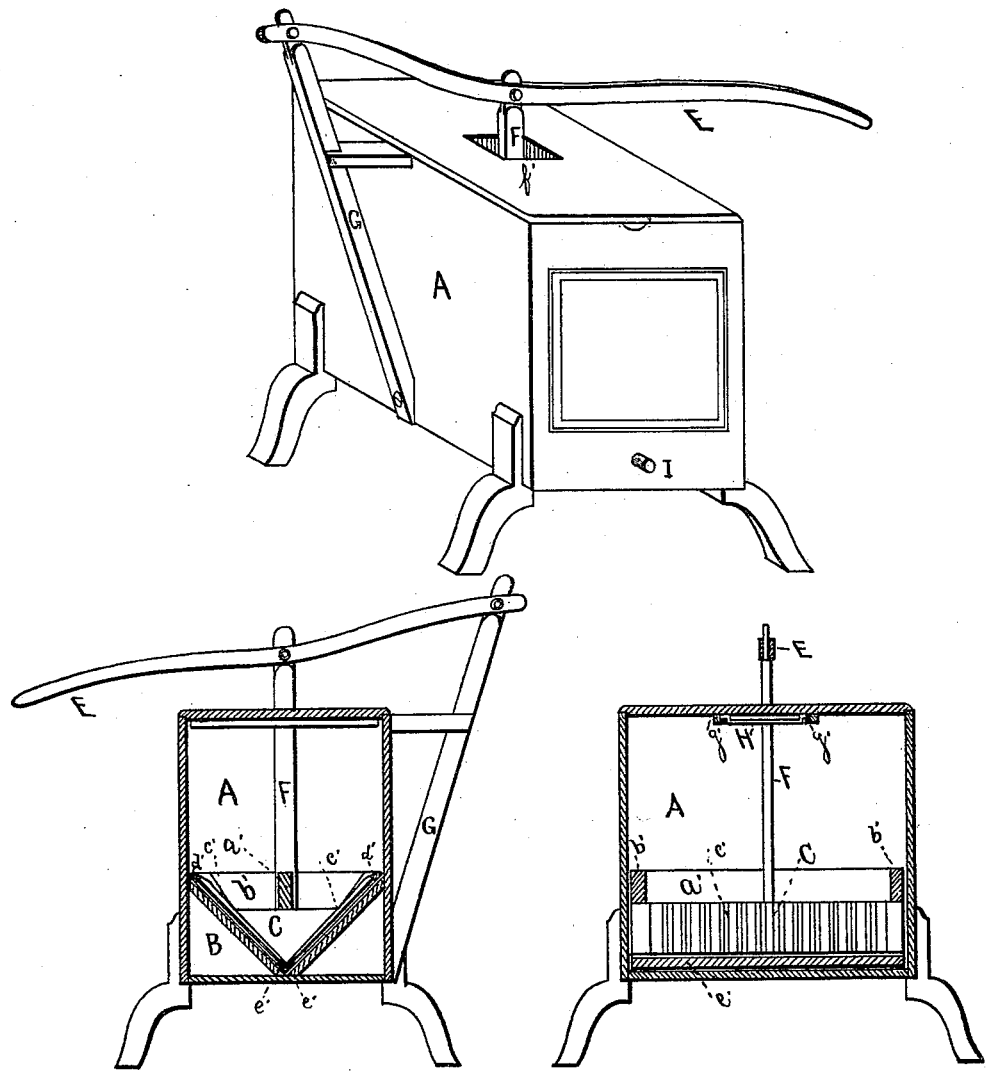

ALFRED GOODNOUGH AND THOMAS THOMPSON DRENNEN, OF PORTLAND, OREGON.

IMPROVEMENT IN RECIPROCATING CHURNS.

Specification forming part of Letters Patent No. 165,560, dated July 13, 1875; application filed November 21, 1874.

*To all whom it may concern:*

Be it known that we, ALFRED GOODNOUGH and THOMAS THOMPSON DRENNEN, of the city of Portland, in the county of Multnomah and State of Oregon, have invented a new Churn; and we do hereby declare that the following is a full and exact description of the same and its operation, reference being had to the annexed drawings, making a part of this specification, in which—

Figure 1 is a perspective view; Fig. 2, longitudinal section; Fig. 3, a transverse section.

The object of our invention is to so construct a churn that its manner of operation and the results are an advantage over any other.

We construct a box, A, Figs. 1, 2, 3, with the bottom B, Fig. 3, and set at the angle as shown, to receive the dasher C, Figs. 2 and 3. The dasher C is made as follows: with a horizontal center bar, $a'$, Figs. 2 and 3, and to each end the cross-bars $b'$ $b'$, to which is hung on trunnions the dasher gate $c'$ $c'$, Fig. 3, with diamond-shaped bars, placed equal distances apart, and set into the top bars $d'$ $d'$ and bottom bars $e'$ $e'$. The lower end of bottom bar $e'$ $e'$ is beveled, as shown, so that when closed it runs to a point, and the dasher, when down, fits in the bottom of the churn, as shown, and on raising the dasher C, Figs. 2 and 3, the flaps of their own weight spread open, allowing the settlement of cream to fill up the trough at the bottom of the churn. The downward movement of the brake E, Figs. 1 and 2, closes the flaps or gates, and forcing the cream between the bars alternately. To the center of the horizontal bars $a'$, Figs. 2 and 3, is attached a vertical bar or piston, F, Figs. 1, 2, and 3, which passes through the opening in the lid at $f$, Figs. 1 and 2, and has a connection for the brake-handle E, Figs. 1, 2, which has its center supported by the brace G, Figs. 1 and 2. On the under side of lid or cover are placed two slides, $g'$ $g'$, Fig. 2, to carry a cross-head, H, Figs. 2 and 3; and from the center of the cross-head H the cross-head is beveled toward both ends, so that in the oscillating motion of the vertical bar or piston F, Figs. 1, 2, and 3, the cream collecting on the piston is scraped off on the cross-head, and slides off the incline into the churn. At the bottom of the churn-box A, Figs. 1 and 2, is placed a draw-off for the milk, and as shown at I, Fig. 1.

We claim as our invention—

The dasher C, in combination with bottom of box A and cross-head H, and operated in the manner as and for the purpose set forth and described.

ALFRED GOODNOUGH.
THOMAS THOMPSON DRENNEN.

Witnesses:
SEYMOUR STILES,
J. KRUMBEIN.